US012058640B2

(12) United States Patent
Berggren et al.

(10) Patent No.: US 12,058,640 B2
(45) Date of Patent: Aug. 6, 2024

(54) METHODS AND DEVICES FOR DUAL-DIRECTION POSITIONING OF A DEVICE

(71) Applicant: Sony Group Corporation, Tokyo (JP)

(72) Inventors: Anders Berggren, Lund (SE); Basuki Priyanto, Lund (SE); Peter Karlsson, Lund (SE)

(73) Assignee: Sony Group Corporation, Tokyo (JP)

( * ) Notice: Subject to any disclaimer, the term of this patent is extended or adjusted under 35 U.S.C. 154(b) by 359 days.

(21) Appl. No.: 17/441,734

(22) PCT Filed: Mar. 25, 2020

(86) PCT No.: PCT/US2020/024555
§ 371 (c)(1),
(2) Date: Sep. 22, 2021

(87) PCT Pub. No.: WO2020/198271
PCT Pub. Date: Oct. 1, 2020

(65) Prior Publication Data
US 2022/0191815 A1    Jun. 16, 2022

(30) Foreign Application Priority Data

Mar. 25, 2019  (SE) .................................... 1930094-6
Mar. 25, 2019  (SE) .................................... 1930095-3

(51) Int. Cl.
*H04W 64/00*     (2009.01)
*H04L 5/00*      (2006.01)
*H04W 12/037*    (2021.01)

(52) U.S. Cl.
CPC ........... *H04W 64/00* (2013.01); *H04L 5/0051* (2013.01); *H04W 12/037* (2021.01); *H04W 64/006* (2013.01)

(58) Field of Classification Search
CPC ..................................................... H04W 64/00
See application file for complete search history.

(56) References Cited

U.S. PATENT DOCUMENTS

2010/0323720 A1* 12/2010 Jen ........................ H04W 64/00
                                                    455/456.1
2012/0289247 A1* 11/2012 Siomina .............. H04W 64/003
                                                    455/456.1
(Continued)

FOREIGN PATENT DOCUMENTS

CN        1771441 A      5/2006
CN        1859785 A     11/2006
(Continued)

OTHER PUBLICATIONS

International Preliminary Report on Patentability from corresponding International Application No. PCT/US2020/024555 mailed on Oct. 7, 2021, 10 pages.
(Continued)

*Primary Examiner* — Qutbuddin Ghulamali
(74) *Attorney, Agent, or Firm* — Tucker Ellis LLP

(57) ABSTRACT

A positioning estimate for a user equipment (UE) is determined based on a combination of uplink-based positioning and downlink-based positioning. Positioning measurements based on downlink signals and uplink signals can be utilized to determine the positioning estimate. The positioning estimate may be computed by the UE or a node of a wireless communications network. This positioning scheme can include two parts, where a first part and second part are either uplink-based or downlink-based, but the two parts are different from each other. Positioning measurements performed in the first part may be sent along with reference signals in the second part.

20 Claims, 9 Drawing Sheets

(56) References Cited

U.S. PATENT DOCUMENTS

| | | |
|---|---|---|
| 2014/0254412 A1 | 9/2014 | Siomina |
| 2017/0339658 A1* | 11/2017 | Wang .................... G01S 5/021 |
| 2018/0020423 A1* | 1/2018 | Wang .................... H04W 64/00 |
| 2019/0053239 A1 | 2/2019 | Zhou et al. |
| 2019/0053280 A1 | 2/2019 | Rico Alvarino |

FOREIGN PATENT DOCUMENTS

| | | |
|---|---|---|
| CN | 107710824 A | 2/2018 |
| CN | 107735958 A | 2/2018 |
| WO | WO-2011019357 A1 | 2/2011 |
| WO | 2012154105 A1 | 11/2012 |
| WO | WO-2013153515 A2 | 10/2013 |
| WO | WO-2014057398 A2 | 4/2014 |
| WO | WO-2014114204 A1 | 7/2014 |
| WO | 2015149581 A1 | 10/2015 |
| WO | 2018013672 A1 | 1/2018 |
| WO | 2018028925 A1 | 2/2018 |
| WO | 2018136224 A2 | 7/2018 |
| WO | 2018203819 A1 | 11/2018 |

OTHER PUBLICATIONS

3GPP TSG RAN Meeting #83, Mar. 18-21, 2019, RP-190196, "Status report of SI: Study on NR positioning support", pp. 1-20, Intel Corporation, Shenzhen, China.

International Search Report and Written Opinion from corresponding International Application No. PCT/US2020/024555 mailed on Jul. 1, 2020, 12 pages.

Office Action from corresponding Swedish Application No. 1930095-3 mailed on Nov. 11, 2019.

Qualcomm Incorporated, "Combined Downlink and Uplink NR Positioning Procedures", 3rd Generation Partnership Project (3GPP), Feb. 25-Mar. 1, 2019, Athens, Greece, R2-1901371, 9 pages.

Catt, "NR Positioning with the combination of DL/UL Measurements", 3rd Generation Partnership Project (3GPP), Feb. 25-Mar. 1, 2019, Athens, Greece, R1-1901982, 3 pages.

* cited by examiner

METHODS AND DEVICES FOR DUAL-DIRECTION POSITIONING OF A DEVICE

RELATED APPLICATION DATA

This application claims the benefit of Swedish Patent Application No. 1930095-3, filed Mar. 25, 2019, and Swedish Patent Application No. 1930094-6, filed Mar. 25, 2019. The entireties of the aforementioned patent applications are incorporated herein by reference.

TECHNICAL FIELD OF THE INVENTION

The technology of the present disclosure relates generally to operations of a network node and/or a wireless communications device in a wireless communications network and, more particularly, to methods and apparatus for positioning of a device.

BACKGROUND

In existing wireless communications systems (e.g., 3G or 4G-based systems), estimations of a device position are generally considered acceptable when regulatory positioning requirements are satisfied. For example, for emergency calls, a position estimate is only required to be accurate within 50 meters in 4G systems. Positioning is an important feature under consideration of the Third Generation Partnership Project (3GPP) for 5G systems such as New Radio (NR). The specification is targeting use cases beyond emergency call services (i.e. regulatory requirements), such as commercial use-cases and 5G systems may be expected to provide sub-meter positioning accuracy.

Cellular-based positioning may be downlink based or uplink based. In legacy systems, timing measurements and angle measurements are common techniques in downlink-based positioning. For instance, observed time difference of arrival (OTDOA) is a multilateration technique in 4G systems. In this technique, a base station (eNB) transmits positioning reference signals (PRS). A user equipment (UE) estimates time of arrival (TOA) based on the received PRS. The TOA measured from the PRS of multiple base stations are subtracted from a TOA corresponding to a reference base station to generate OTDOA measurements. The UE reports the OTDOA measurements or measured time difference (e.g. Reference Signal Time Difference (RSTD)) to a location server. The location server estimates the position of the UE based on the RSTD report and known coordinates of the base stations. Another technique, such as Enhanced cell ID with LTE systems, involves a base station estimating an angle of arrival (AoA) of a signal transmitted by the UE. The base station exploits phase difference from at least two receive antennas to estimate the AoA, for example.

One approach in legacy systems for uplink-based positioning is uplink time difference of arrival (UTDOA). With this approach, a user equipment (UE) transmits a reference signal, which is received by one or more base stations or dedicated location measurement units (LMUs). The base stations (or LMUs) estimate a time of arrival and report the estimate to a location server to estimate the UE's position (e.g. via multilateration if multiple base stations measure a time of arrival).

SUMMARY

With legacy systems, radio access technology (RAT) dependent positioning (e.g. uplink-based or downlink-based positioning) may be performed when a UE is in connected mode. In legacy systems, the use-case for RAT dependent positioning is typically limited to positioning to support emergency calling and, as such, the UE would already in connected mode for the emergency call. In 5G NR systems, use-cases for positioning may not be limited to emergency call support and may include commercial use-cases. In addition, 5G use-cases may demand various parameters for positioning results (e.g. vertical positioning, horizontal positioning, mobility, and/or latency) and various accuracy requirements (e.g. within hundreds of meters, within tens of meters, or sub-meter). These use-cases may not otherwise require the UE to be in connected mode as with emergency calls. In such situations, positioning that is dependent on being in connected mode may cause long latency in getting a position of the UE, incur additional signaling overhead, and increase UE power consumption due to signaling between the UE and a network node to enter and maintain connected mode. While RAT independent techniques (e.g. GPS or other sensors) may be utilized by the UE for positioning, reporting a position acquired with these techniques to the network may still depend on being in connected mode.

The disclosed approach provides a multi-directional positioning scheme whereby downlink-based and uplink-based positioning are combined to support a positioning estimation. With multi-directional positioning, a UE may be positioned while the UE is in connected mode, idle mode, or inactive mode. The UE and one or more network nodes may be provided a configuration for multi-directional positioning. The configuration may indicate positioning resources (e.g. uplink resources and downlink resources) for respective positioning directions of the operation. The configuration may also specific a timing relationship between the directions. In a first direction, which may be any one of uplink or downlink, appropriate reference signals are transmitted to one or more recipients. For instance, for an uplink direction, the UE may transmit uplink references signals to a set of network nodes. Conversely, for a downlink direction, one or more network nodes may transmit downlink reference signals to the UE. A recipient of a reference signal performs positioning measurements on the received signal. Information related to the positioning measurements may be transmitted together with corresponding references signals in a second direction of the positioning operation. Measurements performed on reference signals in the second direction may be compared to the measurements performed on reference signals in the first direction to provide positioning feedback and to determine measurement quality. Thus, the multi-directional positioning improves positioning accuracy while also reducing latency by enabling corrective actions in positioning estimation without requiring additional iterations of reference signal transmissions and measurements.

According to one aspect of the disclosure, a method for positioning of a wireless communications device performed by a network node includes: determining resources for use when positioning the wireless communication device using a combination of uplink-based and downlink-based positioning, wherein the resources comprise resources for uplink-based positioning and resources for downlink-based positioning; and transmitting, to the wireless communication device, positioning configuration information indicative of the determined resources and a timing relationship between first positioning measurements and second positioning measurements.

According to one embodiment of the method, the timing relationship indicates a time between one of a start or an end of the first positioning measurements and a start of the second positioning measurements.

According to one embodiment of the method, the positioning configuration information indicates the determined resources based on the timing relationship.

According to one embodiment of the method, the resources for uplink-based positioning occur a predetermined number of subframes before or after the resources for downlink-based positioning.

According to one embodiment, the method includes estimating the position of the wireless communications device based on measurement results acquired during both the uplink-based positioning and the downlink-based positioning.

According to one embodiment of the method, determining the resources for downlink-based positioning is based on determining the resources for uplink-based positioning and the timing relationship or determining the resources for uplink-based positioning is based on determining the resources for downlink-based positioning and the timing relationship.

According to one embodiment, the method includes: transmitting downlink reference signals to the wireless communications device according to the resources for downlink-based positioning; receiving one or more uplink reference signals from the wireless communications device according to the resources for uplink-based positioning; and measuring a positioning parameter based on the one or more uplink reference signals.

According to one embodiment, the method includes transmitting uplink measurement information to the wireless communications device, the uplink measurement information relates at least in part to one or more positioning measurements performed on the one or more uplink reference signals received from the wireless communications device.

According to one embodiment of the method, transmitting the uplink measurement information to the wireless communications device occurs together with transmitting the downlink reference signals to the wireless communications device.

According to one embodiment, the method includes receiving downlink measurement information from the wireless communications device, the downlink measurement information relates at least in part to one or more positioning measurements performed by the wireless communications device on the downlink reference signals.

According to one embodiment of the method, receiving the downlink measurement information from the wireless communications device occurs together with receiving the one or more uplink reference signals from the wireless communications device.

According to one embodiment, the method includes: determining updated resources for use when positioning the wireless communication device using a combination of uplink-based and downlink-based positioning, wherein the updated resources comprise at least one of updated resources for uplink-based positioning or updated resources for downlink-based positioning; and transmitting, to the wireless communication device, at least one control message indicative of the determined updated resources.

According to one embodiment of the method, determining updated resources occurs after performing one of uplink-based positioning or downlink-based positioning.

According to one embodiment, the method includes receiving a request for dual-direction positioning to achieve positioning requirements.

According to another aspect of the disclosure, a method for facilitating positioning of a wireless communications device includes: receiving, from a network node, positioning configuration information indicative of resources for use when positioning the wireless communication device using a combination of uplink-based and downlink-based positioning and a timing relationship between the uplink-based and the downlink-based positioning, wherein the resources comprise resources for uplink-based positioning and resources for downlink-based positioning and the positioning configuration information indicates the resources in accordance with the timing relationship; transmitting uplink reference signals to one or more network nodes according to the resources for uplink-based positioning; receiving one or more downlink reference signals from the one or more network nodes according to the resources for downlink-based positioning; and measuring a positioning parameter based on the one or more downlink reference signals.

According to one embodiment, the method includes estimating a position of the wireless communications device based on measurements results acquired during both the uplink-based positioning and the downlink-based positioning.

According to one embodiment of the method, the positioning configuration information indicates the resources for uplink-based positioning in accordance with a timing relationship to the resources for downlink-based positioning.

According to one embodiment, the method includes transmitting downlink measurement information to the one or more network nodes, the downlink measurement information relates at least in part to one or more positioning measurements performed on the one or more downlink reference signals received from the one or more network nodes.

According to one embodiment of the method, transmitting the downlink measurement information to the one or more network nodes occurs together with transmitting the uplink reference signals to the one or more network nodes.

According to one embodiment, the method includes: receiving uplink measurement information from the one or more network nodes, the uplink measurement information relates at least in part to one or more positioning measurements performed by the one or more network nodes on the one or more uplink reference signals; and estimating a position of the wireless communications device based on the uplink measurement information and measurements of the one or more downlink reference signals received.

According to one embodiment of the method, receiving the uplink measurement information from the one or more network nodes respectively occurs together with receiving the one or more downlink reference signals from the one or more network nodes.

According to one embodiment, the method includes sending a request for dual-direction positioning.

According to another aspect of the disclosure, a network node configured to operate in a wireless communications network includes a wireless interface over which wireless communications with a wireless communications device are carried out; an interface over which communications with a core network are carried out; and a control circuit configured to: determine resources for use when positioning the wireless communication device using a combination of uplink-based and downlink-based positioning, wherein the resources comprise resources for uplink-based positioning and resources for downlink-based positioning; and transmit, to the wireless communication device, positioning configuration information indicative of the determined resources and a timing relationship between first positioning measurements and second positioning measurements.

According to one embodiment of the network node, the timing relationship indicates a time between one of a start or an end of the first positioning measurements and a start of the second positioning measurements.

According to one embodiment of the network node, the positioning configuration information indicates the determined resources based on the timing relationship.

According to one embodiment of the network node, wherein the resources for uplink-based positioning occur a predetermined number of subframes before or after the resources for downlink-based positioning.

According to one embodiment of the network node, the control circuit is further configured to estimate the position of the wireless communications device based on measurement results acquired during both the uplink-based positioning and the downlink-based positioning.

According to one embodiment of the network node, the control circuit is further configured to: determine the resources for downlink-based positioning is based on determining the resources for uplink-based positioning, or determine the resources for uplink-based positioning is based on determining the resources for downlink-based positioning.

According to one embodiment of the network node, the control circuit is further configured to: transmit downlink reference signals to the wireless communications device according to the resources for downlink-based positioning; receive one or more uplink reference signals from the wireless communications device according to the resources for uplink-based positioning; and measure a positioning parameter based on the one or more uplink reference signals.

According to one embodiment of the network node, the control circuit is further configured to transmit uplink measurement information to the wireless communications device, the uplink measurement information relates at least in part to one or more positioning measurements performed on the one or more uplink reference signals received from the wireless communications device.

According to one embodiment of the network node, the control circuit is further configured to transmit the uplink measurement information to the wireless communications device together with the downlink reference signals.

According to one embodiment of the network node, the control circuit is further configured to receive downlink measurement information from the wireless communications device, the downlink measurement information relates at least in part to one or more positioning measurements performed by the wireless communications device on the downlink reference signals.

According to one embodiment of the network node, the control circuit is further configured to: determine updated resources for use when positioning the wireless communication device using a combination of uplink-based and downlink-based positioning, wherein the updated resources comprise at least one of updated resources for uplink-based positioning or updated resources for downlink-based positioning; and transmit, to the wireless communication device, at least one control message indicative of the determined updated resources.

According to one embodiment of the network node, the control circuit is configured to determine the updated resources occurs after performing one of uplink-based positioning or downlink-based positioning.

According to one embodiment of the network node, the control circuit is further configured to receive a request for dual-direction positioning to achieve positioning requirements.

According to another aspect of the disclosure, a wireless communications node configured to operate in a wireless communications network includes a wireless interface over which wireless communications with one or more network nodes are carried out; and a control circuit configured to: receive, from a network node, positioning configuration information indicative of resources for use when positioning the wireless communication device using a combination of uplink-based and downlink-based positioning and a timing relationship between the uplink-based and the downlink-based positioning, wherein the resources comprise resources for uplink-based positioning and resources for downlink-based positioning and the positioning configuration information indicates the resources in accordance with the timing relationship; transmit uplink reference signals to one or more network nodes according to the resources for uplink-based positioning; receive one or more downlink reference signals from the one or more network nodes according to the resources for downlink-based positioning; measure a positioning parameter based on the one or more downlink reference signals.

According to one embodiment of the wireless communications device, the control circuit is further configured to estimate a position of the wireless communications device based on measurements results acquired during both the uplink-based positioning and the downlink-based positioning.

According to one embodiment of the wireless communications device, the control circuit is further configured to transmit downlink measurement information to the one or more network nodes, the downlink measurement information relates at least in part to one or more positioning measurements performed on the one or more downlink reference signals received from the one or more network nodes.

According to one embodiment of the wireless communications device, the control circuit is further configured to transmit the downlink measurement information to the one or more network nodes together with the uplink reference signals.

According to one embodiment of the wireless communications device, the control circuit is further configured to: receive uplink measurement information from the one or more network nodes, the uplink measurement information relates at least in part to one or more positioning measurements performed by the one or more network nodes on the one or more uplink reference signals; and estimate a position of the wireless communications device based on the uplink measurement information and measurements of the one or more downlink reference signals received.

According to one embodiment of the wireless communications device, the control circuit is further configured to send a request for dual-direction positioning.

DETAILED DESCRIPTION OF EMBODIMENTS

Figure 1:
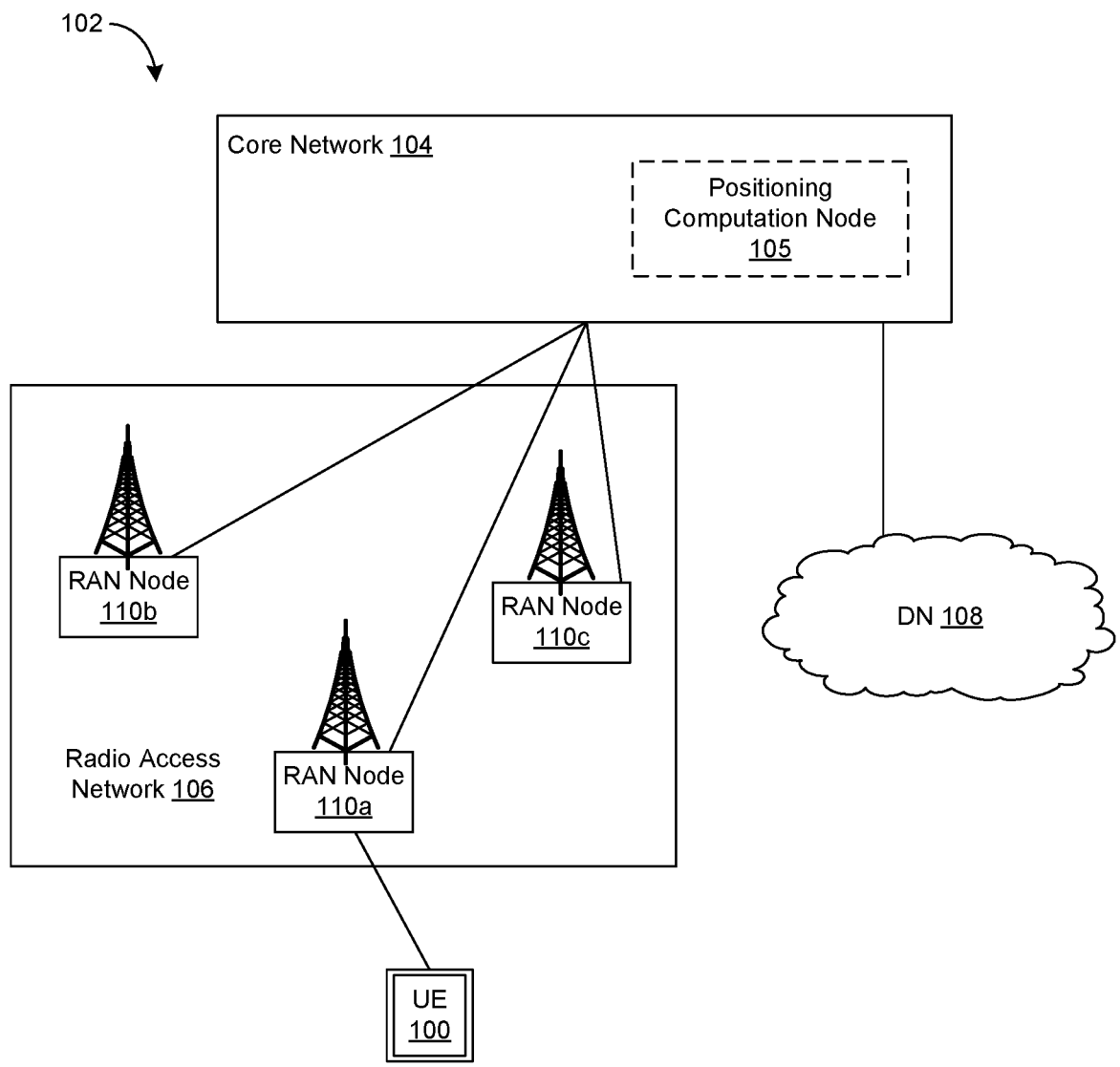
FIG. 1 is a schematic block diagram of a representative operational network environment for a wireless communications device, also referred to as a user equipment (UE).

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

FIG. 1 is a schematic diagram of an exemplary network environment in which the disclosed techniques are implemented. It will be appreciated that the illustrated network environment is representative and other environments or systems may be used to implement the disclosed techniques. Also, various functions may be carried out by a single device, such as by a radio access node, user equipment, or core network node, may be carried out in a distributed manner across nodes of a computing or wireless communications environment.

The network environment is relative to an electronic device, such as a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, a camera, and an internet of things (IoT) device. Since aspects of the disclosed techniques may be applicable to non-3GPP networks, the UE 100 may be more generically referred to as a wireless communications device or a radio communications device.

The network environment includes a wireless communications network 102 that may be configured in accordance with one or more 3GPP standards, such as a 3G network, a 4G network or a 5G network. The disclosed approaches may apply to other types of networks.

In instances where the network 102 is a 3GPP network, the network 102 includes a core network (CN) 104 and a radio access network (RAN) 106. The core network 104 provides an interface to a data network (DN) 108. The DN 108 represents operator services, connection to the Internet, third party services, etc. Details of the core network 104 are omitted for simplicity of description, but it is understood that the core network 104 includes one or more servers that host a variety of network management functions, examples of which include, but are not limited to, a user plane function (UPF), a session management function (SMF), a core access and mobility management function (AMF), an authentication server function (AUSF), a network exposure function (NEF), a network repository function (NRF), a policy control function (PCF), a unified data management (UDM), an application function (AF), and a network slice selection function (NSSF). In addition, the core network 104 may include a positioning computation node 105 configured to estimate a position of UE 100 based on measurements reported by the UE 100 for downlink-based positioning, measurements reported by the RAN 106, for example, with uplink-based positioning, or a combination of both as described herein. As discussed later, the positioning computation node 105 may request the UE 100 and/or RAN 106 to support dual-direction positioning. Further, while shown in FIG. 1 as being included in the core network 104, the positioning computation node 105 may be included in any network node, including nodes of RAN 106, or device, such as UE 100.

The RAN 106 includes a plurality of RAN nodes 110. In the illustrated example, there are three RAN nodes 110a, 110b, and 110c. Fewer than or more than three RAN nodes 110 may be present. For 3GPP networks, each RAN node 110 may be a base station such as an evolved node B (eNB) base station or a 5G generation gNB base station. The RAN node 110 may include one or more Tx/Rx points (TRPs). Since aspects of the disclosed techniques may be applicable to non-3GPP networks, the RAN nodes 110 may be more generically referred to as network access nodes, an alternative example of which is a WiFi access point.

A radio link may be established between the UE 100 and one of the RAN nodes 110 for providing wireless radio services to the UE 100. The RAN node 110 to which the radio link is established will be referred to as the serving RAN node 110 or serving base station. Other RAN nodes 110 may be within communication range of the UE 100. The RAN 106 is considered to have a user plane and a control plane. The control plane is implemented with radio resource control (RRC) signaling between the UE 100 and the RAN node 110. Another control plane between the UE 100 and the core network 104 may be present and implemented with non-access stratum (NAS) signaling.

Figure 2:
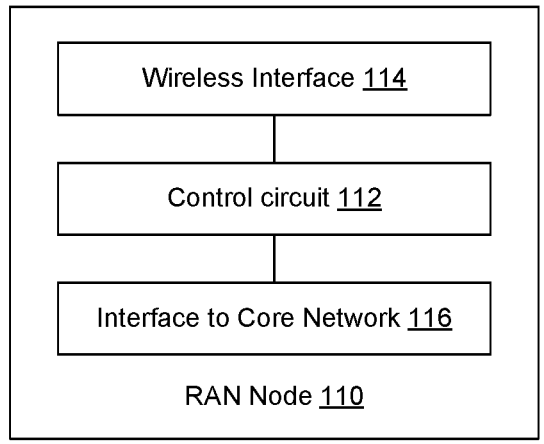
FIG. 2 is a schematic block diagram of a radio access network (RAN) node from the network environment.

With additional reference to FIG. 2, each RAN node 110 typically includes a control circuit 112 that is responsible for overall operation of the RAN node 110, including controlling the RAN node 110 to carry out the operations described in herein. In an exemplary embodiment, the control circuit may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 112 in order to carry out operation of the RAN node 110.

The RAN node 110 also includes a wireless interface 114 for establishing an over the air connection with the UE 100. The wireless interface 114 may include one or more radio transceivers and antenna assemblies to form the TRP(s). The RAN node 110 also includes an interface 116 to the core network 104. The RAN node 110 also includes an interface (not shown) to one or more neighboring RAN nodes 110 for conducting network coordination in the RAN 106.

In accordance with a further aspect, uplink-based positioning may involve a location measurement unit (LMU). The LMU may be a separate node (e.g. within the RAN 106) or it may be co-located with or a component of the RAN node 110. For example, the LMU may be a computer-based system communicatively coupled with and positioned near the RAN node 110. Alternatively, the LMU may be integrated into the RAN node 110 and may be implemented in by the logical instructions stored in the memory of the control circuit 112.

Figure 3:
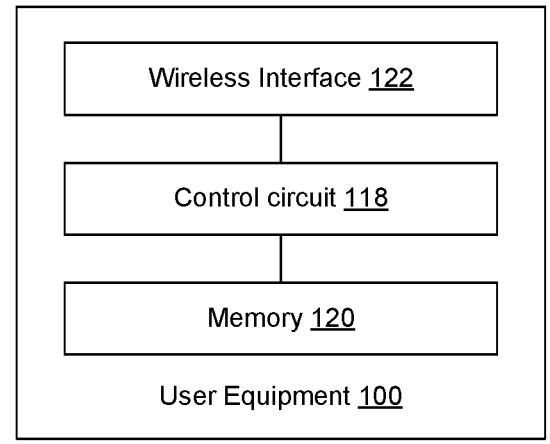
FIG. 3 is a schematic block diagram of the UE from the network environment.

With additional reference to FIG. 3, illustrated is a schematic block diagram of the UE 100. The UE 100 includes a control circuit 118 that is responsible for overall operation of the UE 100, including controlling the UE 100 to carry out the operations described herein. In an exemplary embodiment, the control circuit 118 may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 118 or a separate memory 120 in order to carry out operation of the UE 100.

The UE 100 includes a wireless interface 122, such as a radio transceiver and antenna assembly, for establishing an over the air connection with the serving base station 110. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Figure 4:
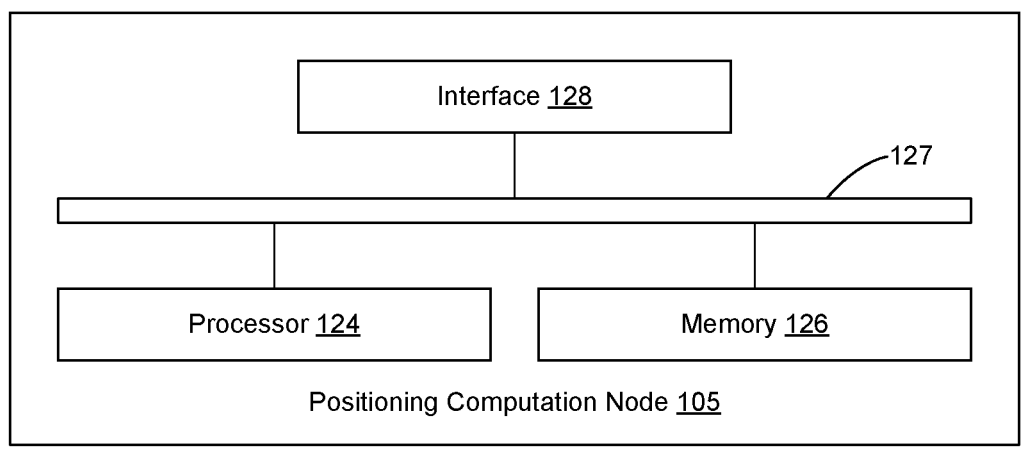
FIG. 4 is a schematic block diagram of a positioning computation node from the network environment.

In FIG. 4, a schematic block diagram of an exemplary embodiment of a positioning computation node 105 is illustrated. The positioning computation node 105 executes logical instructions (e.g., in the form of one or more software applications) to generate positioning estimates. It is to be understood, however, that aspects of the positioning computation node 105 may be distributed across various nodes of the core network 104 or another computing environment.

The positioning computation node 105 may be implemented as a computer-based system that is capable of executing computer applications (e.g., software programs) that carry out functions of the computation node 105. As is typical for a computer platform, the positioning computation node 105 may include a non-transitory computer readable medium, such as a memory 126 that stores data, information sets and software, and a processor 124 for executing the software. The processor 124 and the memory 126 may be coupled using a local interface 127. The local interface 127 may be, for example, a data bus with accompanying control bus, a network, or other subsystem. The computation node 105 may have various input/output (I/O) interfaces for operatively connecting to various peripheral devices, as well as one or more interfaces 128. The interface 128 may include for example, a modem and/or a network interface card. The communications interface 128 may enable the computation node 105 to send and receive data signals to and from other computing devices in the core network 104, the RAN 106, and/or in other locations as is appropriate.

Dual-Direction Positioning

As described above, legacy positioning techniques involve either downlink-based positioning or uplink-based positioning. Techniques will be described for supporting positioning of a wireless communications device where downlink and uplink schemes are jointly used together. A dual-direction approach may improve accuracy and reduce latency. For instance, a positioning estimate is based on measurements taken in both directions (e.g. downlink and uplink) as opposed to a single direction. Measurements from one direction are reported (e.g. transmitted) along with reference signals to be measured in the other direction to enable positioning estimation based on measurements from both directions. Thus, quality of measurement can be compared. Further, dual direction positioning provides a feedback mechanism. For example, measurements taken in a first part can indicate a need for corrective action which may be immediately taken in a second part. Thus, additional rounds of positioning measurements may be avoided. In addition, dual-direction positioning may be performed while the wireless communications device is in connected mode, idle mode, or inactive mode.

A node of the wireless communications network, for example the positioning computation node 105 and/or a wireless communications device, may request dual-direction positioning (also referred to herein as two-direction positioning). The request may be sent to a set of network nodes selected to participate in dual-direction positioning. The network nodes may include a serving network node (e.g. RAN node 110*a*) of a wireless communications device (e.g. UE 100), neighboring network nodes (e.g. RAN nodes 110*b-c*), and/or location measurement units (LMUs), which may be associated or integrated with the network nodes. The request may indicate a required accuracy desired for the positioning, desired parameters for a positioning estimate, and/or may also instruct on a configuration for positioning. According to various aspects, the configuration may indicate a positioning scheme to be employed (e.g. uplink-based first followed by downlink-based, downlink-based first followed by uplink-based, network-based estimation, UE-based estimation, etc.), positioning resources to be used to facilitate positioning (e.g. resources uplink-based positioning and resources for downlink-based positioning), a set of network nodes (e.g. RAN nodes) selected to facilitate positioning, and/or a timing relationship between downlink resources and uplink resources. The configuration may be used by the serving network nodes, neighboring network nodes, and/or the wireless communications device to facilitate positioning of the wireless communications. For instance, the configuration generally guides how a positioning operation is performed for a given wireless communications device within the wireless communications network. In accordance with embodiments described herein, the configuration may be utilized when the wireless communications device is in connected mode, idle mode or inactive mode. In one example, the configuration may be based on the desired accuracy.

The serving network node may transmit positioning configuration information to wireless communication device in response to the request. For instance, the serving network node may transmit one or more control messages to the wireless communications device. The one or more control messages may include the positioning configuration information, which indicates a configuration for dual-direction positioning as described above. Upon receiving the configuration information, the wireless communications device and participating network nodes may perform operations to facilitate positioning based on both directions (e.g. downlink and uplink).

Figure 5:
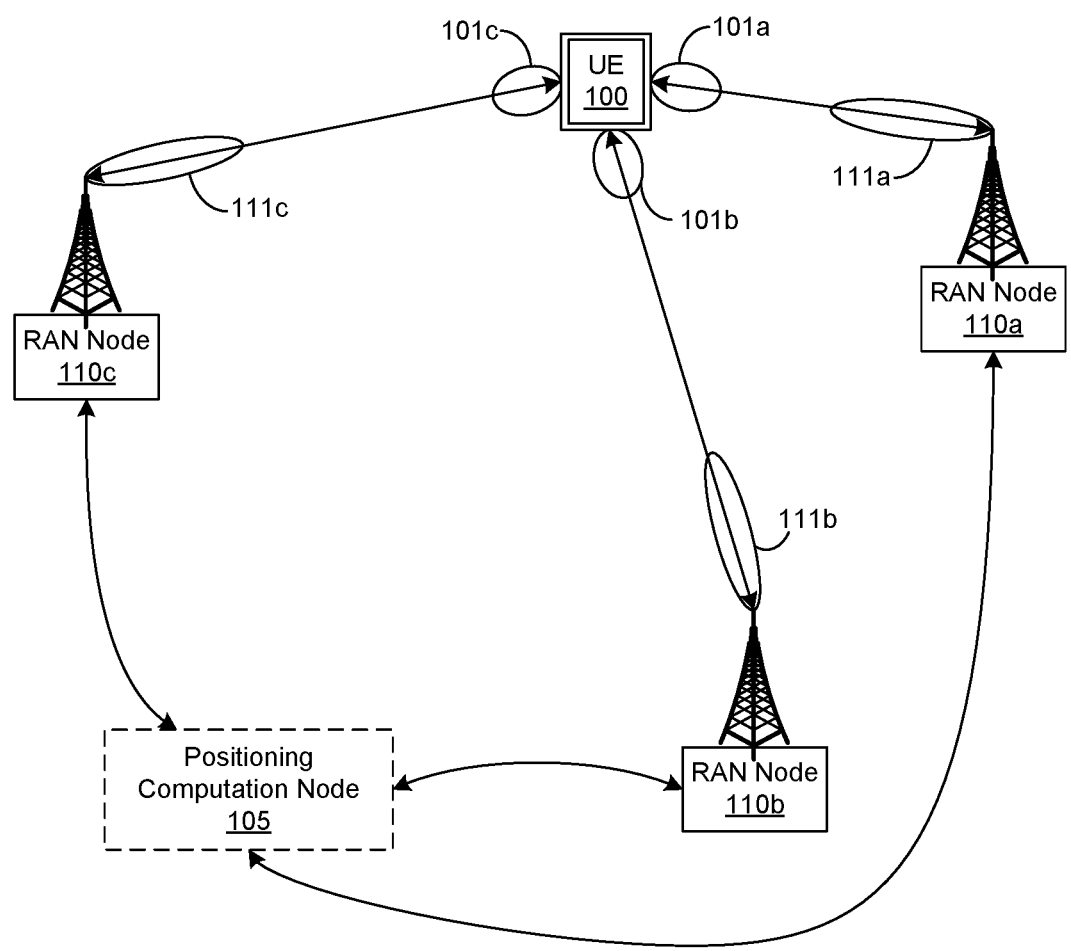
FIG. 5 is a schematic diagram of an exemplary positioning technique.

Turning to FIG. 5, an exemplary embodiment of a positioning technique within wireless communications network 102 is illustrated. As shown in FIG. 5, multiple RAN nodes 110 may participate in positioning to create multiple reference points utilized to locate the UE 100 via multilateration. FIG. 5 illustrates an example having three RAN nodes 110, which support generating a positioning estimate of UE 100 via trilateration. It is to be appreciated that a greater or fewer number of RAN nodes 110 may participate in positioning depending, for example, on a required accuracy or required parameters for the positioning estimate.

As mentioned above, the positioning computation node 105 or UE 100 may send a request for dual-direction positioning. For example, UE 100 may send the request for dual-direction positioning when some application needs high positioning accuracy. The request may be sent to a serving network node (e.g. RAN node 110*a*) and neighboring network nodes (e.g. RAN nodes 110*b-c*) selected to facilitate positioning of UE 100. Alternatively, the serving RAN node 110*a* may inform the neighboring network nodes of the request after receiving the request from the UE 100 or positioning computation node 105. The serving RAN node 110*a* may transmit configuration information to UE 100 to enable the UE 100 to perform dual-direction positioning. The configuration information may also be shared with neighbor RAN nodes 110*b-c*. The configuration information may be generated by the positioning computation node 105, the serving RAN node 110*a*, or a combination of the two. For example, a portion of the configuration information (e.g. direction order, timing relationship) may be provided by the positioning computation node 105 and another portion (e.g. positioning resources) may be provided by the serving RAN node 110*a*. In addition, while shown in FIG. 5 as a separate component, it is to be appreciated that the positioning computation node 105 may be a core network node (e.g. a location server or serving mobile location center (SMLC or E-SMLC)), a radio access network node (e.g. integrated with a RAN node 110), or a component of UE 100.

More specifically, a serving network node 110*a* and/or positioning computation node 105 may determine resources for use when positioning the UE 100 using a combination of uplink-based and downlink-based positioning. In one example, the resources may include resources for uplink-based positioning and resources for downlink-based positioning. The serving network node 110*a* may transmit at least one control message specifying positioning configuration information indicative of the determined resources. A timing relationship may be determined between the resources for uplink-based positioning and the resources for downlink-based positioning. The timing relationship may be indicated in the positioning configuration information. In another example, for instance, the timing relationship may be utilized to determine the resources for downlink-based positioning based on determining the resources for uplink-based positioning or determine the resources for uplink-based positioning is based on determining the resources for downlink-based positioning. That is, resources for a second part of the two-direction positioning may be determined based on resources for a first part and the timing relationship.

Dual-direction positioning may occur with a first part or first direction being a first positioning technique followed by a second part or second direction being a second positioning technique. In one example, the first direction may be uplink-based and the second direction may be downlink-based. In another example, the inverse may be performed such that the first direction is downlink-based followed by the second direction, which is uplink-based. The order of positioning techniques may be indicated in the positioning configuration information or the at least one control message. The positioning configuration information may also indicate timing relationship (e.g. a time gap) between the first part and the second part. The time gap may be employed to perform positioning measurements on reference signals received in the first part and prepare measurement information to be reported. The time gap may be approximately 5-20 ms. It is to be appreciated that other time gaps may be employed such as, but not limited to, 1-100 ms, 2-50 ms, and 5-20 ms. The time gap determined for dual-direction positioning may be determined based on channel conditions and/or UE mobility. For example, a stationary UE may be positioning according to a longer time gap since channel conditions may be relatively unchanged. However, a fast moving UE may require a small time gap to ensure positioning accuracy.

The measurement information obtained in the first part may influence the second part. For instance, the configuration may be updated for the second part. For example, a resource size or transmit power for the second part may be changed based on measurements acquired in the first part. In addition, the recipient (e.g. receiver of reference signals) in the second part may utilize the measurement information form the first part to improve positioning accuracy. That is, the recipient may combine measurements for positioning estimation or compare measurement to determine measurement quality.

In a first example, the first part involves downlink-based positioning and the second part involves uplink-based positioning. This approach may be utilized with network-based positioning where a network node (e.g. RAN node 110, LMU, or positioning computation node 105) computes a positioning estimate. However, it is to be appreciated that this approach may also be employed for UE-based positioning where a wireless communications device (e.g. UE 100) computes the positioning estimate. In the latter case, the measurements in the second part (e.g. uplink-based measurements) may be transmitted at a later time to the UE 100.

According to this example, the RAN nodes 110*a-c* may periodically transmit downlink reference signals in the first part. The downlink reference signals may, in one example, may be a positioning reference signals (PRS) similar to PRS in legacy systems. In another example, other existing signals generally utilized to assist data transmissions may be used for positioning purposes. For instance, channel state information-reference signal (CSI-RS), tracking reference signal (TRS), and/or synchronization signal block (SSB) may be utilized as downlink reference signals for positioning purposes.

The resources (e.g. time/frequency information) for the downlink reference signals may be indicated in the configuration information. The period for transmitting downlink reference signals with certain length may be approximately 100 ms. The configuration information may also indicate a set of network nodes (e.g. RAN nodes 110*a-c*) for which respective downlink reference signals should be measured by the UE 100. In the first part, the UE 100 performs positioning measurements (e.g. measures a positioning parameter) on the downlink reference signals received. The positioning measurements may be timing-based (e.g., TOA, Relative TOA (RTOA), UTDOA, etc.) and/or signal strength-based (e.g. reference signal received power (RSRP), received signal strength indication (RSSI), etc.). The measurements along with time stamps indicating respective times at which the measurements are performed may be referred to herein as measurement information. Here, with the UE 100 performing the measurements on downlink reference signals, the measurement information may be referred to as downlink measurement information.

For the second part, the UE 100 may transmit uplink reference signals to the set of network nodes (e.g. RAN nodes 110*a-c*) indicated in the configuration information as participants in positioning. In addition, the UE 100 may utilize resources for uplink-based positioning indicated in the configuration information (e.g. the at least one control message) received from the network. The resources may be indicated based on a timing relationship to transmission (e.g. broadcast) of the downlink reference signals from the RAN nodes 110.

The second part, uplink-based in this example, may be based on uplink reference signals only. For instance, the UE 100 may only transmit uplink reference signals and does not transmit the downlink measurement information. Alternatively, the second part may be based on the uplink reference signals and the downlink measurement information. UE 100 may also include the downlink measurement information in the same transmission as the uplink reference signals. Alternatively, the downlink measurement information may be a separate transmission. UE 100 may transmit the downlink measurement information for all measured network nodes to the serving RAN node 110*a*. However, the UE 100 may also transmit respective downlink measurement information to respective RAN nodes 110. The RAN nodes 110 receiving downlink measurement information may be selected by the UE 100, for example, based on a quality of the measurements. Moreover, if such selection occurs, the UE 100 may transmit uplink reference signals to the selected RAN nodes 110.

The RAN nodes 110 receiving uplink reference signals perform positioning measurements on the signals received. The positioning measurements may be timing-based (e.g., TOA, Relative TOA (RTOA), UTDOA, etc.) and/or signal strength-based (e.g. reference signal received power (RSRP), received signal strength indication (RSSI), etc.). The measurements may be compared with measurements in the downlink measurement information and/or combined with measurements in the downlink measurement information. For instance, the combination of downlink measurements and uplink measurements may be sent in a measurement report to the positioning computation node 105 to compute a position of UE 100.

When UE 100 is in idle mode, a downlink-first approach may be altered since UE 100 is typically not allocated to transmit data in idle mode. Here, the UE 100 may receive uplink resources indicated in the configuration information. The uplink resources being usable by the UE 100 during idle mode. The configuration information may also indicate a timing relationship between resources for uplink reference signals and resources for downlink reference signals. For instance, the uplink resources may be T subframes before or after a starting time of downlink resources.

For example, UE 100 can receive and measure downlink reference signals from RAN nodes 110. Downlink measurement information (e.g. time stamps, signal strength measurements, ToA measurements, etc.) can be transmitted along with the uplink reference signals to be measured by the RAN nodes 110. The downlink measurement information can be provided to the positioning computation node 105 along with measurements reports form the RAN nodes 110. Thus, the positioning computation node 105 may generate a positioning estimate based on both UE-side and network-side measurements.

The uplink resources indicated in the configuration information may include uplink data resources to accommodate the downlink measurement information. Data transmissions often have encrypted payloads. The UE 100 may utilize a payload encryption from a previously obtained security context to transmit the downlink measurement information.

In another example, the first part involves uplink-based positioning and the second part involves downlink-based positioning. This approach may be utilized with UE-based positioning where UE 100 computes a positioning estimate. However, it is to be appreciated that this approach may also be employed for network-based positioning where a network node (e.g. RAN node 110, LMU, or positioning computation node 105) computes the positioning estimate. In the latter case, the measurements in the second part (e.g. downlink-based measurements) may be transmitted at a later time to the network node.

According to this example, UE 100 transmits one or more uplink reference signals to RAN nodes 110. The uplink reference signal may be an uplink positioning reference signal (UL-PRS), a sounding reference signal (SRS), or substantially any other reference signal capable of being measured for positioning purposes. In an optional example, there may be an initial transmission of uplink reference signals to generate an updated configuration. For instance, the RAN nodes 110 may receive uplink reference signals, perform measurements on the signals receives, and a set of RAN nodes 110 to be involved in positioning may selected based on respective measurement qualities. The measurements performed at this initial stage may also indicate resource size, transmit power, and other parameters for the transmission of uplink reference signals by the UE 100.

UE 100, with or without optional updated configuration, transmits uplink reference signals to a set of RAN nodes 110. The RAN nodes 110 perform positioning measurements on the uplink reference signals. The positioning measurements may be timing-based (e.g., TOA, Relative TOA (RTOA), UTDOA, etc.) and/or signal strength-based (e.g. reference signal received power (RSRP), received signal strength indication (RSSI), etc.). The measurements along with time stamps indicating respective times at which the measurements are performed may be referred to herein as measurement information. Here, with the RAN nodes 110 performing the measurements on uplink reference signals, the measurement information may be referred to as uplink measurement information.

For the second part, the RAN nodes 110 (e.g. the participating RAN nodes) may transmit downlink reference signals to the UE 100. As before, the RAN nodes 110 may periodically transmit downlink reference signals. The second part, downlink-based in this example, may be based on the downlink reference signals only. For instance, the RAN nodes 110 may only transmit downlink reference signals and do not transmit uplink measurement information. Alternatively, the second part may be based on the downlink reference signals and the uplink measurement information. Thus, in accordance with the configuration information for dual-direction positioning, the RAN nodes 110 may also transmit the uplink measurement information to the UE 100. The UE 100 may perform measurements on the downlink reference signals. The positioning measurements may be timing-based (e.g., TOA, Relative TOA (RTOA), UTDOA, etc.) and/or signal strength-based (e.g. reference signal received power (RSRP), received signal strength indication (RSSI), etc.). The measurements may be compared with measurements in the uplink measurement information and/or combined with measurements in the uplink measurement information. For instance, the combination of downlink measurements and uplink measurements may be utilized by UE 100 to compute a positioning estimate. That is, if UE 100 knows geographical locations (e.g. coordinates) for the set of RAN nodes 110, then the UE 100 may compute the estimate.

In these examples, the UE 100 and RAN nodes 110 may employ multiple beam operations. For instance, UE 100 may transmit the uplink reference signal and/or downlink measurement information on transmit beam 101a, 101b, and/or 101c as shown in FIG. 5. In another embodiment, UE 100 may transmit the uplink reference signal omnidirectionally. For instance, with operations in FR1 (i.e. NR frequency band generally below 6 GHz), the uplink may be omnidirectional whereas operations in FR2 (i.e. mmWave) may typically use narrow beams. However, it is to be appreciated that UE 100 may transmit omnidirectionally or via beams as shown in FIG. 5 regardless of the frequency band. Similarly, RAN nodes 110 may also transmit downlink reference signals and/or uplink measurement information via respective transmit beams 111a, 111b, and 111c, respectively. The transmit beam may be referred to as spatial domain transmit filter. Likewise, the receive beam may also be referred to as spatial domain receive filter. Furthermore, a beam direction can be represented as beam index.

Beam operations may also be employed on the receive side such that the RAN nodes 110a-c may receive the uplink reference signal from UE 100 via respective receive beams 111a-c. Accordingly, in addition to the positioning measurements described above, the RAN nodes 110 may include beam-related information in the measurement report sent to the positioning computation node 105 or the uplink measurement information transmitted to UE 100. Conversely, the UE 100 may receive downlink reference signals from RAN nodes 110 via respective beams 101a-c. The UE 100 may include beam-related information in the downlink measurement information and/or utilize the beam-related information in positioning estimation. In some instances, the RAN nodes 110 may employ beam sweeping such as, for example, when transmitting downlink reference signals.

Beam-related information may enable computation of more accurate positioning estimates based on acquired angle information, for example. The beam information may include transmit beam information and/or receive beam information. In the case of omnidirectional uplink transmission, the beam information may include only receive beam information. The beam information may include a beam index that corresponds to a predetermined beam configuration for the RAN node 110 or UE 100, observed or estimated beam parameters (e.g. AoD, AoA, beam width, etc.), and/or an antenna panel index. For instance, an antenna panel may support multiple beams. To illustrate, a transmitter or received may have two panels, which each support four beams. Accordingly, the beam information may include the antenna panel index and the corresponding beam index. Regarding observed or estimated beam parameters, angle information may be provided as two angles (e.g. horizontal (azimuth) and vertical (elevation)) in order to specify a beam in three-dimensional space.

Figure 6:
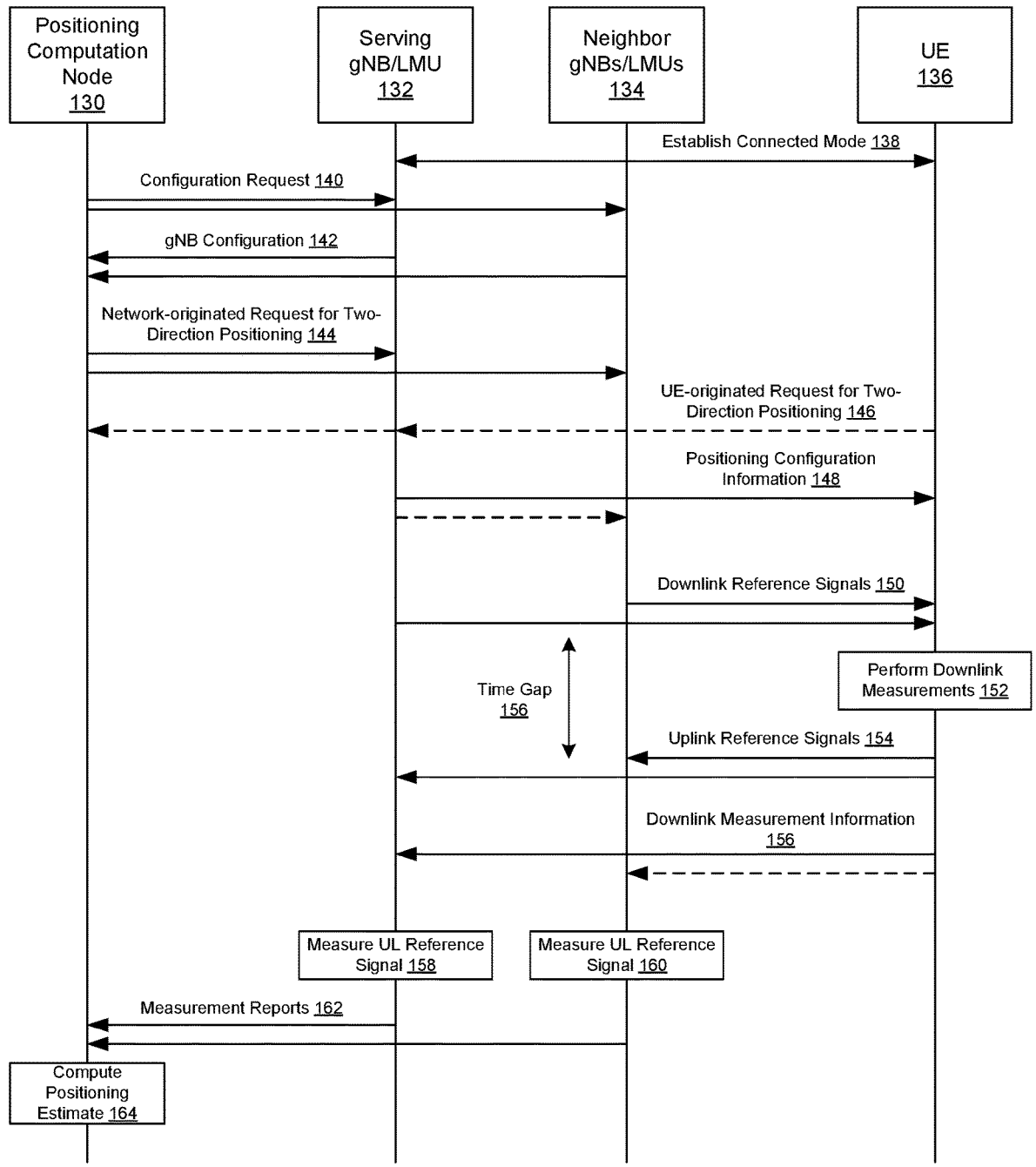
FIG. 6 is a signaling diagram of an exemplary procedure to two-direction positioning of a UE starting with a downlink direction.

Turning to FIG. 6, an exemplary signaling diagram for dual-direction or two-direction positioning of a wireless communications device, beginning with a downlink direction. Accordingly, in a first part or first direction, downlink-based positioning is involved. In a second part or second direction, uplink-based positioning is performed. As shown in FIG. 6, a positioning computation node 130, which may be similar to positioning computation node 105 described above, interacts with a serving base station (gNB) or LMU 132, one or more neighbor base stations or LMUs 134, and a UE 136. The serving and neighbor base stations may be similar to RAN nodes 110 described above and UE 136 may be similar to UE 100 described above. Initially, connected mode may be established between the serving base station 132 may and UE 136 as indicated at 138. For example, serving base station 132 may page UE 136, which perform random access procedures. After additional messages are exchanged, UE 136 is in connected mode. To prepare for positioning procedures, the positioning computation node 130 may collect configurations of base stations 132, 134 and/or UE 136 by sending configuration requests 140 to the serving base station 132 and the neighbor base stations 134. The base stations 132, 134 send gNB configurations 142 to the positioning computation node 130 in response to request 140. The gNB configurations 142 may include respective receive beam configurations of base stations 132 and 134. In one example, the serving base station 132 may include the UE configuration along with its configuration 142. The UE configuration may include the uplink reference signal configuration and a UE transmit beam configuration.

To activate dual-direction positioning, the positioning computation node 130 may send a network-originated request for two-direction positioning 144 (also referred to as a positioning request 144) to the serving base station 132, the neighbor base stations 134 selected to participate in positioning, and other base stations (not shown) which may also participate. The positioning request 144 may indicate a desired accuracy, other requirements for the positioning estimate, as well as a possible configuration. For example, the request 144 may indicate an order of positioning techniques (e.g. downlink first). In another example, the UE 136 may send an UE-originated request for two-direction positioning 146 (also referred to as a positioning request 146) to the positioning computation node 130 and/or serving base station 132.

In response to the positioning request 144 or 146, the serving base station 132 sends positioning configuration information 148 to the UE 136. The positioning configuration information 148, as described herein, may be in the form of at least one control message transmitted by the serving base station 132 (or positioning computation node 130). The positioning configuration information 148 may include positioning resources being usable by the UE 136 for the positioning operation. For example, in the embodiment illustrated in FIG. 6, the positioning resources may include uplink resources usable by the UE 136 to transmit uplink reference signals and/or downlink measurement information. The positioning configuration information 148 may also indicate a set of network nodes participating in positioning. This set includes network nodes from which UE 136 may measure reference signals and to which the UE 136 may transmit uplink reference signals and/or downlink measurement information.

Serving base station 132 and neighbor base stations 134 may periodically transmit downlink reference signals 150 as described above. In a first part of the two-direction positioning, the UE 136 may receive the downlink reference signals and performs downlink positioning measurements 152. The downlink positioning measurements may be timing-based or signal-strength-based. The positioning measurements as well as time stamps indicating times at which the positioning measurements are performed may be collected as downlink measurement information. The downlink positioning measurement information may also include beam-related information corresponding to a receive beam (e.g. UE beam) and/or a transmit beam (e.g. base station beam).

Positioning configuration information 148 may indicate a timing relationship such as time gap 156 that indicates a gap between the first part and a second part of the two-direction positioning procedure. In one example, the time gap 156 provides time for measurements to be performed for the first part and prepared for reporting. The time gap 156 also triggers the second part so that channel conditions or other factors may be relatively unchanged.

As shown in FIG. 6, the second part involves uplink-based positioning. As such, UE 136 may transmit uplink reference signals 154 to serving base station 132 and neighbor base stations 134 (e.g. selected to facilitate positioning). In addition, the UE 136 transmits downlink positioning measurement information 156. In one example, the UE 136 transmit downlink positioning measurement information 156 to only the serving base station 132. In another example, respective downlink positioning measurement information 156 is transmitted to respective base stations selected to facilitate positioning. As described above, the downlink positioning measurements information may include positioning measurements on downlink reference signals 150 and time stamps.

The neighbor base stations 134 perform respective positioning measurements 160 on the uplink reference signals 154 and the serving base station 132 also performs a positioning measurement 158 on the uplink reference signals 154. The positioning measurements 158, 160 may be combined with the downlink measurement information 156 into respective measurement reports 162 sent to the positioning computation 130, which calculates a positioning estimate 164 based on the reports 162. The reports 162 may include positioning measurement values (e.g. a positioning timing measurement or positioning signal strength measurement) along with beam information (e.g. transmit beam information and/or receive beam information). Accordingly, the positioning estimate is based on both downlink measurements and uplink measurements.

Figure 7:
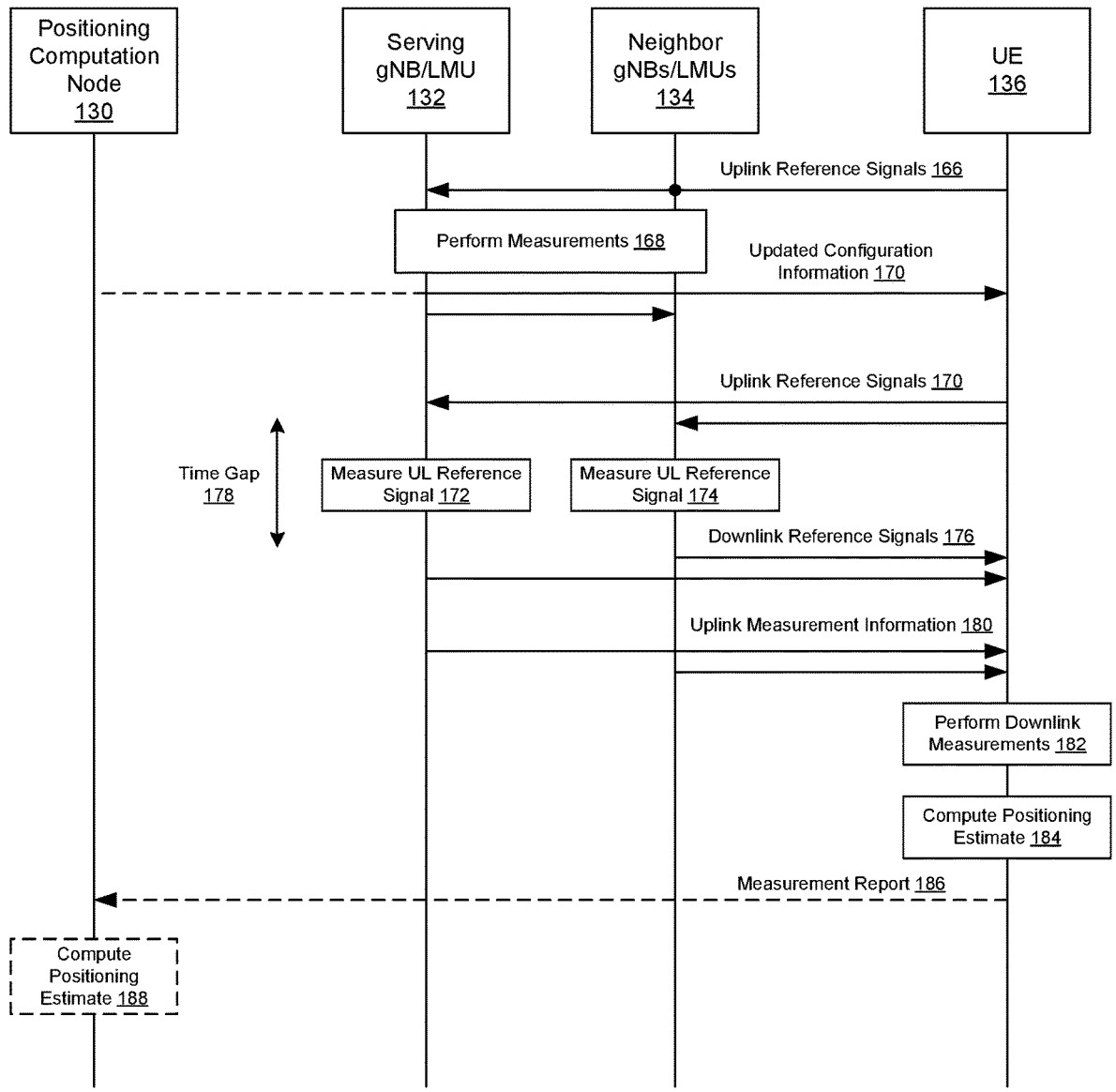
FIG. 7 is a signaling diagram of an exemplary procedure to two-direction positioning of a UE starting with an uplink direction.

In FIG. 7, an exemplary signaling diagram for dual-direction or two-direction positioning of a wireless communications device, beginning with an uplink direction. Similar to FIG. 6, here in FIG. 7, a positioning computation node 130, interacts with a serving base station (gNB) or LMU 132, neighbor base stations or LMUs 134, and a UE 136. Further, similar signaling to that shown in FIG. 6 may be performed to prepare for dual-direction positioning. In FIG. 7, such signaling has been omitted for brevity.

In FIG. 7, optional steps may be taken to update the configuration. For instance, UE 136 may transmit uplink reference signals 166 based on initial configuration information (e.g. configuration information 148). The serving base station 132 and neighbor base stations 134 may perform measurements 168 on the uplink reference signals 166. Based on the measurements, a set of base stations may be selected to participate in positioning based, for example, on measurement quality of measurements 168. For instance, base stations indicating relatively poor quality of measurements may be excluded. In addition, the measurements 168 may indicate need to update resource configuration or other parameters (e.g. transmit/receive beams, transmit power, etc.) for reference signals in either direction. As shown in FIG. 7, updated configuration information 170 is transmitted to the UE 136 and/or neighbor base stations 134.

In a first part of two-direction positioning in FIG. 7, using uplink resources indicated in the configuration information 148 or 170, the UE 136 may utilize one or more transmit beams to transmit uplink reference signals 170 to serving base station 132 and neighbors base station 134 (e.g. selected to facilitate positioning). The serving base station 132 performs a positioning measurements 172 on the uplink reference signal 170 and the neighbor base stations 134 also perform respective positioning measurements 174 based on the uplink reference signal 170. These measurements may be timing-based or signal-strength-based. The measurements as well as time stamps indicating times at which the measurements are performed may be collected as uplink measurement information. The uplink measurement information may also include beam-related information corresponding to a receive beam (e.g. base station beam) and/or a transmit beam (e.g. UE station beam).

Configuration information 148 and/or 170 may indicate a timing relationship such as time gap 178 that indicates a gap between the first part and a second part of the two-direction positioning procedure. In one example, the time gap 178 provides time for measurements to be performed for the first part and prepared for reporting. The time gap 178 also triggers the second part soon enough so that channel conditions or other factors may be relatively unchanged.

As shown in FIG. 7, the second part involves downlink-based positioning. As such, the UE 136 may measure downlink reference signals. Serving base station 132 and neighbor base stations 134 may periodically transmit downlink reference signals 176 as described above. Furthermore, serving base station 132 and neighbor base stations 134 may a periodically transmit downlink reference signals 176. This is typically triggered when the periodic downlink positioning reference signals are not available/sparsely configured. In addition, the serving base station 132, neighbor base stations 134, and/or other base stations may transmit uplink measurement information 180 to UE 136. As described above, the uplink measurements information may include positioning measurements on uplink reference signals 170, time stamps, and/or beam-related information.

The UE 136 performs positioning measurement 182 on the downlink reference signals 176. The positioning measurements 182 may be combined with the uplink measurement information 180. The combined measurements may be utilized to compute a positioning estimate 184 if UE 136 knows the coordinates of the networks nodes such as serving base station 132 and neighbor base stations 134.

Alternatively, network-based positioning may be performed. As such, the UE 136 may send a measurement report 186 sent to the positioning computation 130, which calculates a positioning estimate 188 based on the report 186. The report 186 may include positioning measurement values (e.g. a positioning timing measurement or positioning signal strength measurement) along with beam information (e.g. transmit beam information and/or receive beam information). Whether computed UE-side or network-side, the positioning estimate is based on both downlink measurements and uplink measurements.

It is to be appreciated that the above sequences described in FIGS. 6 and 7 are exemplary and alternative orders may be employed in the respective sequences.

FIGS. 8-11 illustrate exemplary process flows representing steps that may be embodied by UEs 100, 136 and network nodes 110, 132, 134. Although illustrated in a logical progression, the illustrated blocks of FIGS. 8-11 may be carried out in other orders and/or with concurrence between two or more blocks. Therefore, the illustrated flow diagrams may be altered (including omitting steps) and/or may be implemented in an object-oriented manner or in a state-oriented manner.

Figure 8:
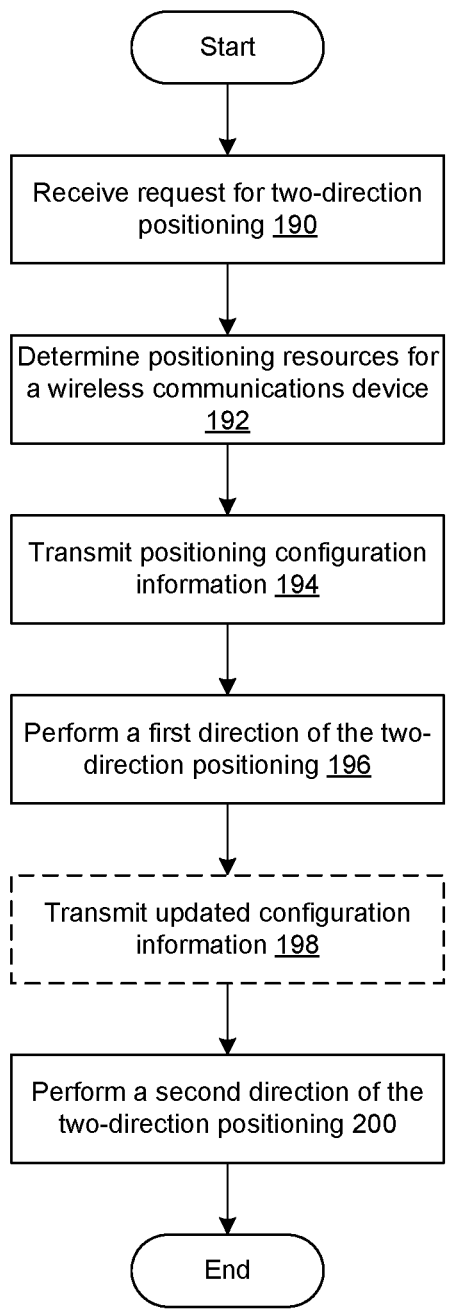
FIG. 8 is a flow diagram of a representative method for two-direction positioning of a wireless communications device, performed at a network node.

FIG. 8 illustrates a representative method for two-direction positioning of a wireless communications device. The method of FIG. 8 may be carried out by a network node, such as RAN node 110. The logical flow may start at block 190 where the network node receives a request for two-direction positioning. The request may originate at a positioning computation node or the wireless communications device. The request may indicate a desired accuracy for a positioning estimate, required parameters for the positioning estimate (e.g. 2D or 3D position), or other requirements such as latency or mobility considerations associated with the positioning estimate. In block 192, positioning resources are determined for the wireless communications device. The positioning resources are usable by the wireless communications device to support positioning. The positioning resources may include uplink resources for uplink reference signals and downlink resources for downlink reference signals. The positioning resources may also include uplink data resources for downlink measurement information and downlink data resources for uplink measurement information as described herein. In block 192, configuration information is transmitted to the wireless communication device. The configuration information may indicate the positioning resources allocated, a positioning order (e.g. downlink then uplink, uplink then downlink), a set of network nodes participating in positioning of the wireless communications device, a desired accuracy and/or requirements, a measurement or resource interval (e.g. period and duration). The configuration information also includes a timing relationship between the two parts of the two-direction positioning. For instance, the timing relationship may indicate a time gap between the downlink resources and the uplink resources and, thus, a time gap between the first part and the second part of the dual-direction positioning.

In block 196, a first direction or a first part of the two-direction positioning is performed. The first direction may be an uplink direction or a downlink direction as indicated in the configuration information. During the first part, reference signals are transmitted and measured. After the first direction is performed, updated configuration information 198 may transmitted to the wireless communications device. The updated configuration information may update resource allocations and other parameters (e.g. transmit power) for the second direction. For instance, measurements taken in the first direction may operate as feedback to tune the configuration of the second part to improve accuracy or correct other effects identified in the first part. In block 200, a second direction of the two-direction positioning is performed. Like the first direction, the second direction involves transmitting reference signals, but in a different direction than the first direction. As described above, measurements from both the first direction and the second direction may be utilized together to compute a positioning estimate.

Figure 9:
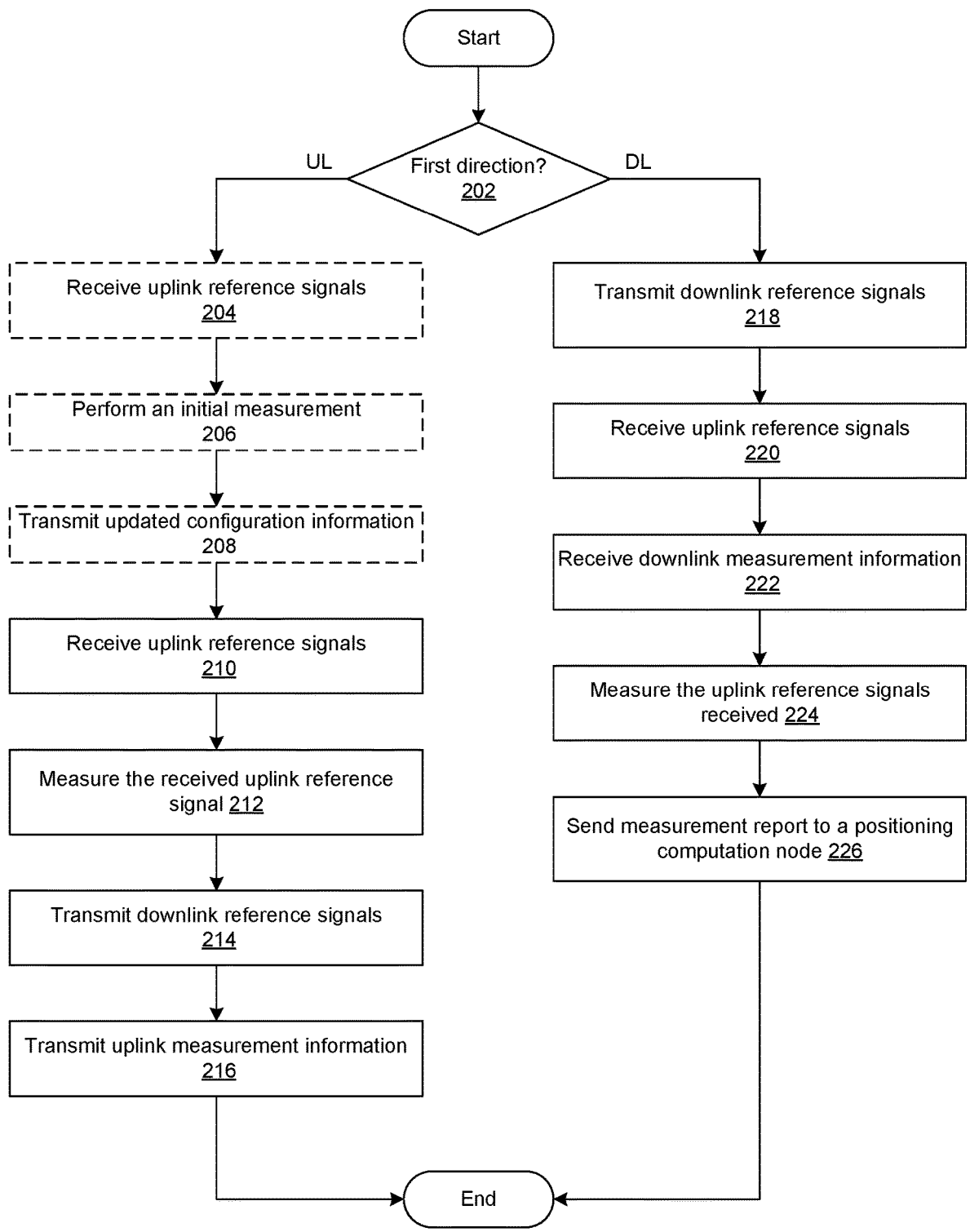
FIG. 9 is a flow diagram of a representative method for two-direction positioning of a wireless communications device, performed at a network node.

Turning to FIG. 9, a representative method for two-direction positioning of a wireless communications device. The method of FIG. 9 may be carried out by a network node, such as RAN node 110, or an LMU. In one example, the method of FIG. 9 may correspond to blocks 196 and 200 of FIG. 8.

The logical flow may start at block 202 where the first direction is identified. If the first direction is an uplink direction, an optional configuration update procedure may be performed. In block 204, uplink reference signals are receive. The uplink reference signals in block 204 may be transmitted according to initial configuration such as the configuration information transmitted in block 194 of FIG. 8. In block 206, measurements are performed on the uplink reference signals. Based on the measurements, updated configuration information may be transmitted in block 208. For instance, the measurements may indicate ideal network nodes to participate in positioning (e.g. based on respective measurement qualities) or changes to resource allocations.

After the optional configuration update, a first part (e.g. uplink direction) of the two-direction positioning may be performed. For instance, in block 210, uplink reference signals are received from using uplink resources allocated to the wireless communications device. In block 212, the network node performs a positioning measurement based on the received uplink reference signals. The positioning measurement may be timing-based (e.g. TDOA, RTOA) or signal-strength-based (e.g. RSSI, RSRP, RSRQ). In block 214, a second part (e.g. downlink direction) of the two-direction positioning may commence with the network node transmitting downlink reference signals. In one example, downlink reference signals are periodically transmitted. In another example, downlink reference signals may be allocated specifically for two-direction positioning. In block 216, uplink measurement information may be transmitted to the wireless communications device. The uplink measurement information includes measurements performed in block 212.

Returning to block 202, if the first direction is a downlink direction, the first part (e.g. downlink) can begin at block 218 where downlink reference signals are transmitted to the wireless communications device. During the configured time gap described above, the wireless communications device may perform positioning measurements on the downlink reference signals and prepare the measurements for reporting. After the time gap, the second part (e.g. uplink) begins at block 220 where uplink reference signals are received from the wireless communications device. In block 222, the network node receives downlink measurement information from the wireless communications device. The downlink measurement information may be transmitted as one transmission with the uplink reference signals or as a separate transmission. In block 224, positioning measurements are performed on the uplink reference signals. The positioning measurements may be compared with the downlink measurement information. In addition, the positioning measurements may be combined with the downlink measurement information in a measurement report sent to a positioning computation node at block 226. The positioning computation node may compute a positioning estimate based on both downlink measurements and uplink measurements.

Figure 10:
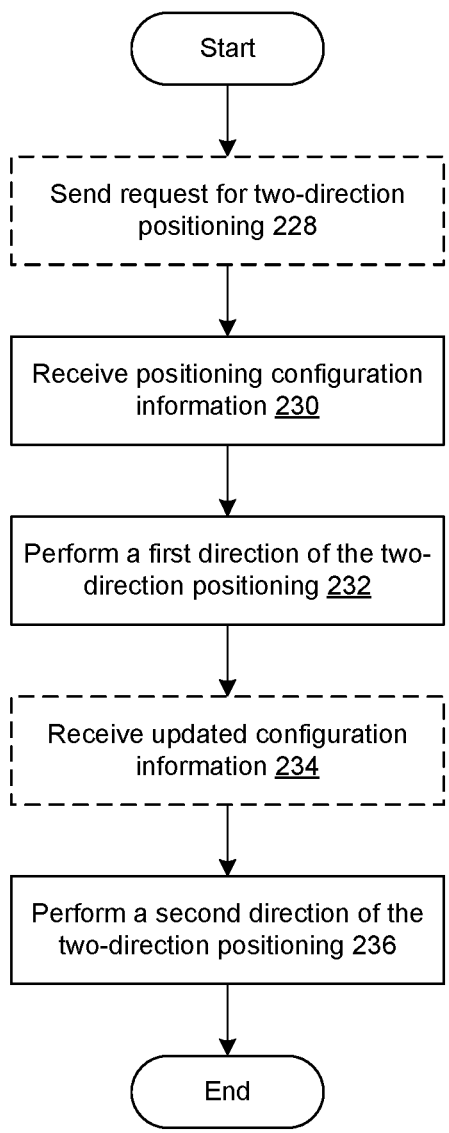
FIG. 10 is a flow diagram of a representative method for two-direction positioning of a wireless communications device, performed at the wireless communications device.

FIG. 10 illustrates a representative method for two-direction positioning of a wireless communications device. The method of FIG. 10 may be carried out by a wireless communication device, such as UE 100. The logical flow may start at optional block 228 where the wireless communications device may send a request for two-direction positioning. The request may be sent to a serving network node and/or a positioning computation node. In block 230, the wireless communications device receives configuration information for the two-direction positioning. The configuration information may indicate the positioning resources allocated, a positioning order (e.g. downlink then uplink, uplink then downlink), a set of network nodes participating in positioning of the wireless communications device, a desired accuracy and/or requirements, a measurement or resource interval (e.g. period and duration). The configuration information also includes a timing relationship between the two parts of the two-direction positioning. For instance, the timing relationship may indicate a time gap between the downlink resources and the uplink resources and, thus, a time gap between the first part and the second part of the dual-direction positioning.

The positioning resources are usable by the wireless communications device to support positioning. The positioning resources may include uplink resources for uplink reference signals and downlink resources for downlink reference signals. The positioning resources may also include uplink data resources for downlink measurement information and downlink data resources for uplink measurement information as described herein.

In block 232, a first direction or a first part of the two-direction positioning is performed. The first direction may be an uplink direction or a downlink direction as indicated in the configuration information. During the first part, reference signals are transmitted by one side and measured on the other. After the first direction is performed, updated configuration information 234 may be received by the wireless communications device. The updated configuration information may update resource allocations and other parameters (e.g. transmit power) for the second direction. For instance, measurements taken in the first direction may operate as feedback to tune the configuration of the second part to improve accuracy or correct other effects identified in the first part. In block 236, a second direction of the two-direction positioning is performed. Like the first direction, the second direction involves transmitting reference signals, but in a different direction than the first direction. As described above, measurements from both the first direction and the second direction may be utilized together to compute a positioning estimate.

Figure 11:
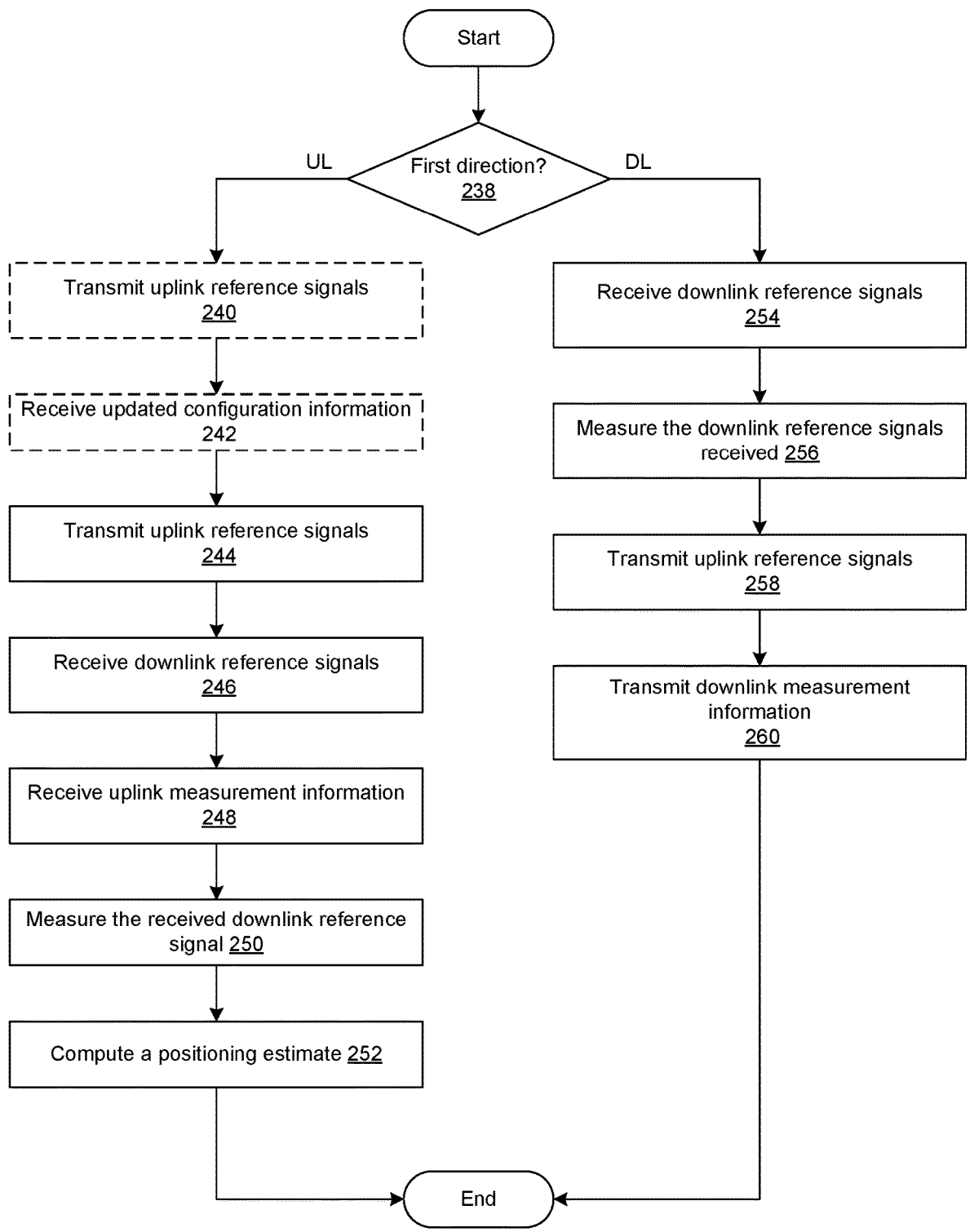
FIG. 11 is a flow diagram of a representative method for two-direction positioning of a wireless communications device, performed at the wireless communications device.

Turning to FIG. 11, a representative method for two-direction positioning of a wireless communications device. The method of FIG. 11 may be carried out by a wireless communications device, such as UE 100. In one example, the method of FIG. 11 may correspond to blocks 232 and 236 of FIG. 10.

The logical flow may start at block 238 where the first direction is identified. If the first direction is an uplink direction, an optional configuration update procedure may be performed. In block 240, uplink reference signals are transmitted. The uplink reference signals in block 240 may be transmitted according to initial configuration such as the configuration information received in block 230 of FIG. 10. In block 242, updated configuration information is received. The updated configuration information may be based on measurements are performed, by a network node, on the uplink reference signals. The updated configuration information may indicate ideal network nodes to participate in positioning (e.g. based on respective measurement qualities) or changes to resource allocations.

After the optional configuration update, a first part (e.g. uplink direction) of the two-direction positioning may be performed. For instance, in block 244, uplink reference signals are transmitted to one or more network nodes using uplink resources allocated to the wireless communications device. The uplink reference signals transmitted may be based on the configuration information received in block 230 of FIG. 10 and/or optional updated configuration information received in block 242. In this example depicted in FIG. 11, block 244 concludes the first direction or first part of the two-direction positioning. A configured time gap elapses before starting the second direction or second part at block 246. During the configured time gap described above, the one or more networks may perform positioning measurements on the uplink reference signals and prepare the measurements for reporting. The second part may begin at block 246 where the wireless communications device receives downlink reference signals from the one or more network nodes. In block 246, the wireless communications device receives uplink measurement information from the one or more network nodes. The uplink measurement information may be transmitted as one transmission with the downlink reference signals or as a separate transmission. In block 250, positioning measurements are performed on the downlink reference signals. The positioning measurements may be compared with the uplink measurement information. In addition, the wireless communications device may compute a positioning estimate at block 252 based on the measurement performed at block 250 and the uplink measurement report. In block 252, the wireless communications device may compute the positioning estimate if geographical locations of the one or more network nodes are known.

Returning to block 238, if the first direction is a downlink direction, the first part (e.g. downlink) can begin at block 254 where downlink reference signals from one or more network nodes are received by the wireless communications device. In block 256, the wireless communications device performs positioning measurements on the downlink reference signals. The positioning measurement may be timing-based (e.g. TDOA, RTOA) or signal-strength-based (e.g. RSSI, RSRP, RSRQ). In block 258, a second part (e.g. uplink direction) of the two-direction positioning may commence with the wireless communications device transmitting uplink reference signals to one or more network nodes using uplink resources allocated to the wireless communications device. For instance, the uplink reference signals transmitted may be based on the configuration information (e.g. indicating at least uplink resources) received in block 230 of FIG. 10. In block 260, downlink measurement information is transmitted to the one or more network nodes. The downlink measurement information may be sent in single transmissions along with uplink reference signals or may be sent as separate transmissions. For example, the configuration information received at block 230 of FIG. 10 may indicate uplink data resources usable by the wireless communication device to transmit the downlink measurement information. On the network side, as described above in FIG. 9, the downlink measurement information may be compared to and/or combined with positioning measurements performed on the uplink reference signals. The combined measurements may be included in a measurement report sent to a positioning computation node. The positioning computation node may compute a positioning estimate based on both downlink measurements and uplink measurements.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method for positioning of a wireless communications device performed by a network node, comprising:
   determining resources for use when positioning the wireless communication device using a combination of uplink-based and downlink-based positioning, wherein the resources comprise resources for uplink-based positioning and resources for downlink-based positioning;
   transmitting, to the wireless communication device, positioning configuration information indicative of the determined resources and a timing relationship between first positioning measurements and second positioning measurements;

performing a first direction of the positioning of the wireless communications device; and transmitting, after performing the first direction, updated configuration information.

2. The method of claim 1, wherein the timing relationship indicates a time between one of a start or an end of the first positioning measurements and a start of the second positioning measurements.

3. The method of claim 1, wherein the positioning configuration information indicates the determined resources based on the timing relationship.

4. The method of claim 1, wherein determining the resources for downlink-based positioning is based on determining the resources for uplink-based positioning and the timing relationship, or wherein determining the resources for uplink-based positioning is based on determining the resources for downlink-based positioning and the timing relationship.

5. The method of claim 4, further comprises receiving downlink measurement information from the wireless communications device, the downlink measurement information relates at least in part to one or more positioning measurements performed by the wireless communications device on the downlink reference signals.

6. The method of claim 1, further comprising:

transmitting downlink reference signals to the wireless communications device according to the resources for downlink-based positioning;

receiving one or more uplink reference signals from the wireless communications device according to the resources for uplink-based positioning; and measuring a positioning parameter based on the one or more uplink reference signals.

7. The method of claim 6, further comprising transmitting uplink measurement information to the wireless communications device, the uplink measurement information relates at least in part to one or more positioning measurements performed on the one or more uplink reference signals received from the wireless communications device.

8. The method of claim 7, wherein transmitting the uplink measurement information to the wireless communications device occurs together with transmitting the downlink reference signals to the wireless communications device.

9. The method of claim 1, wherein receiving the downlink measurement information from the wireless communications device occurs together with receiving the one or more uplink reference signals from the wireless communications device.

10. The method of claim 1, further comprising:

determining updated resources for use when positioning the wireless communication device using a combination of uplink-based and downlink-based positioning, wherein the updated resources comprise at least one of updated resources for uplink-based positioning or updated resources for downlink-based positioning; and transmitting, to the wireless communication device, at least one control message indicative of the determined updated resources.

11. The method of claim 10, wherein determining updated resources occurs after performing one of uplink-based positioning or downlink-based positioning.

12. The method of claim 1, further comprising receiving a request for dual-direction positioning to achieve positioning requirements.

13. A method for facilitating positioning of a wireless communications device, comprising:

receiving, from a network node, positioning configuration information indicative of resources for use when positioning the wireless communication device using a combination of uplink-based and downlink-based positioning and a timing relationship between the uplink-based and the downlink-based positioning, wherein the resources comprise resources for uplink-based positioning and resources for downlink-based positioning and the positioning configuration information indicates the resources in accordance with the timing relationship;

performing a first direction of the positioning of the wireless communications device, wherein the first direction is one of uplink-based positioning or downlink-based positioning;

receiving, after performing the first direction, updated configuration information; and performing a second direction of the positioning of the wireless communications device, the second direction is different than the first direction, wherein for uplink-based positioning, the method includes:

transmitting uplink reference signals to one or more network nodes according to the resources for uplink-based positioning, and wherein for downlink-based positioning, the method includes:

receiving one or more downlink reference signals from the one or more network nodes according to the resources for downlink-based positioning; and measuring a positioning parameter based on the one or more downlink reference signals.

14. The method of claim 13, further comprising estimating a position of the wireless communications device based on measurements results acquired during both the uplink-based positioning and the downlink-based positioning.

15. The method of claim 13, wherein the positioning configuration information indicates the resources for uplink-based positioning in accordance with a timing relationship to the resources for downlink-based positioning.

16. The method of claim 13, further comprising transmitting downlink measurement information to the one or more network nodes, the downlink measurement information relates at least in part to one or more positioning measurements performed on the one or more downlink reference signals received from the one or more network nodes.

17. The method of claim 16, wherein transmitting the downlink measurement information to the one or more network nodes occurs together with transmitting the uplink reference signals to the one or more network nodes.

18. The method of claim 13, further comprising:

receiving uplink measurement information from the one or more network nodes, the uplink measurement information relates at least in part to one or more positioning measurements performed by the one or more network nodes on the one or more uplink reference signals; and estimating a position of the wireless communications device based on the uplink measurement information and measurements of the one or more downlink reference signals received.

19. The method of claim 18, wherein receiving the uplink measurement information from the one or more network nodes respectively occurs together with receiving the one or more downlink reference signals from the one or more network nodes.

20. The method of claim 13, further comprising sending a request for dual-direction positioning.

* * * * *